F. THORPE.
Car-Couplings.

No. 146,214.  Patented Jan. 6, 1874.

Witnesses:
A. W. Almquist
Sedgwick

Inventor:
F. Thorpe
Per Munn & Co.
Attorneys.

UNITED STATES PATENT OFFICE.

FRANKLIN THORPE, OF SIOUX CITY, IOWA.

IMPROVEMENT IN CAR-COUPLINGS.

Specification forming part of Letters Patent No. 146,214, dated January 6, 1874; application filed September 27, 1873.

*To all whom it may concern:*

Figure 1:
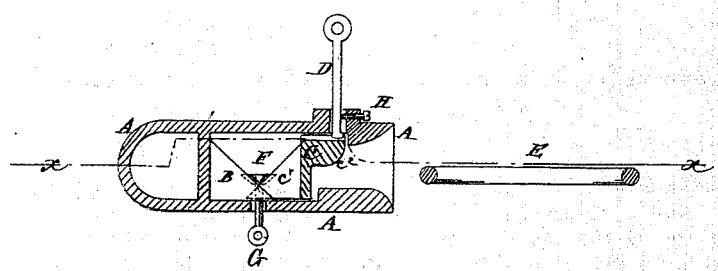
Figure 2:
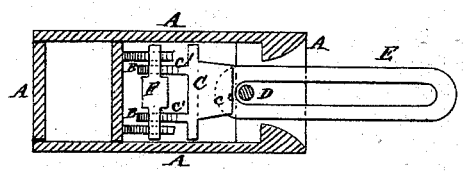
Figure 3:
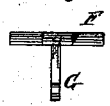

Be it known that I, FRANKLIN THORPE, of Sioux City, in the county of Woodbury and State of Iowa, have invented a new and useful Improvement in Car-Coupling, of which the following is a specification:

Figure 1 is a vertical longitudinal section of my improved coupling. Fig. 2 is a horizontal section of the same taken through the line $x$ $x$, Fig. 1. Fig. 3 is a detail view of the triangular cross-bar and its arm or bolt.

Similar letters of reference indicate corresponding parts.

The invention will first be fully described and then pointed out in the claim.

A is the box or case of the coupler, the mouth of which is made hopper-shaped to guide the entering-link into place. The cavity of the case or bumper A is made in the form of a rectangular chamber, to the rear end of which are attached vertical plates B, the upper sides of which are inclined or curved. In the forward part of this chamber is placed a block, C, having two inclined plates, $c^1$, projecting from its rear side, and so placed that they may work past the plates B, as shown in Fig. 2. Upon the upper part of the forward side of the block C is formed a lip, $c^2$, which, when pushed forward, supports the coupling-pin D, as shown in Fig. 1. The lip $c^2$ projects over the inner end of the link E, and holds said link in a horizontal position, so that it will enter the bumper of the adjacent car without fail as the cars are run together. F is a triangular bar, which crosses the rectangular chamber of the bumper A, and rests upon the inclined edges of the plates B $c^1$, as shown in Figs. 1 and 2. To the middle part of the bar F is attached the upper end of a rod or arm, G, which passes down through a hole in the lower side of the bumper, so that a weight may be attached to it to draw the bar F down with sufficient force to push the block C forward when the coupling-pin is withdrawn.

If desired, the bar F may be made sufficiently heavy to push the block C forward without a suspended weight. The bumper A may be made solid, or its upper and lower sides and inner end may be made of a bar of wrought-iron bent into U shape, and having side plates attached to its edges. The coupling-pin D is designed to have its forward side flattened to receive the end of a set-screw, H, which passes in through a boss formed upon the upper side of the bumper A. The set-screw H is designed to prevent the coupling-pin from being drawn out by striking against a lip or projection formed upon the forward side of the lower end of said pin.

By this construction, when the coupling-pin D is withdrawn, the bar F pushes the block C forward, so that the coupling-pin D may rest upon the lip $c^2$, as shown in Fig. 1. As the cars are run together, the entering-link pushes the block C back, allowing the coupling-pin D to drop through the link E, coupling the cars.

Having thus described my invention, I claim as new and desire to secure by Letters Patent—

The stationary inclines B, the sliding block C having inclines $c^1$ upon its rear side, and a lip, $c^2$, upon the upper part of its forward side, and the triangular bar F, in combination with the bumper A, and coupling-pin D, substantially as shown and described.

FRANKLIN THORPE.

Witnesses:
B. F. SMITH,
P. H. PEASE.